United States Patent
Yoon

(10) Patent No.: US 7,227,887 B2
(45) Date of Patent: Jun. 5, 2007

(54) APPARATUS AND METHOD FOR MOVING PN HYPOTHESIS IN HIGH SPEED SEARCHER

(75) Inventor: Ji-Yong Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 962 days.

(21) Appl. No.: 09/947,688

(22) Filed: Sep. 6, 2001

(65) Prior Publication Data

US 2002/0031170 A1    Mar. 14, 2002

(30) Foreign Application Priority Data

Sep. 8, 2000    (KR) ............................... 2000-53377

(51) Int. Cl.
 *H04B 1/69* (2006.01)
 *H04B 1/707* (2006.01)
(52) U.S. Cl. ...................... 375/150; 375/148; 375/149; 370/515; 370/335
(58) Field of Classification Search ................ 375/140, 375/142, 149, 150, 152, 343, 347, 148; 370/515, 370/335, 342, 441, 331, 332; 708/250–256
See application file for complete search history.

(56) References Cited

U.S. PATENT DOCUMENTS

| | | | |
|---|---|---|---|
| 4,910,521 A * | 3/1990 | Mellon .......................... 342/45 |
| 5,642,377 A * | 6/1997 | Chung et al. ................ 375/145 |
| 6,205,168 B1 * | 3/2001 | Somayazulu ................ 375/149 |
| 6,208,291 B1 * | 3/2001 | Krasner .................. 342/357.12 |
| 6,263,011 B1 * | 7/2001 | Paik et al. ................... 375/149 |
| 6,278,745 B1 * | 8/2001 | Lennen ....................... 375/316 |
| 6,389,067 B1 * | 5/2002 | Riddle et al. ................ 375/225 |
| 6,456,827 B1 * | 9/2002 | Kubo et al. ................... 455/68 |
| 6,813,309 B1 * | 11/2004 | Ogino ......................... 375/148 |

FOREIGN PATENT DOCUMENTS

WO    WO 00/02338    *  1/2000

* cited by examiner

*Primary Examiner*—Mohammed Ghayour
*Assistant Examiner*—Qutub Ghulamali
(74) *Attorney, Agent, or Firm*—The Farrell Law Firm

(57) ABSTRACT

There is provided a PN (Pseudorandom Noise) hypothesis moving apparatus and method in a high speed searcher. In the PN hypothesis moving apparatus, a PN sequence generator system has a PN sequence generator for generating a PN sequence and a PN state register for storing information about a PN state. A correlation counter counts the number of correlations, and a comparator receives the output of the correlation counter, a correlation length, and a search speed, compares them, and provides a PN state saving point and a PN state loading point to the PN sequence generator system according to the comparison to change a PN hypothesis.

6 Claims, 6 Drawing Sheets

APPARATUS AND METHOD FOR MOVING PN HYPOTHESIS IN HIGH SPEED SEARCHER

PRIORITY

This application claims priority to an application entitled "Apparatus and Method for Moving PN Hypothesis in High Speed Searcher" filed in the Korean Industrial Property Office on Sep. 8, 2000 and assigned Serial No. 2000-53377, the contents of which are hereby incorporated by reference.

BACKGROUND OF THE INVENTION

1. Field of the Invention

The present invention relates generally to a searcher used to synchronize a mobile station in an IS-95/cdma2000 system and a method thereof, and in particular, to a searcher which can reduce a dummy time using an improved method of moving a PN (Pseudorandom Noise) sequence offset.

2. Description of the Related Art

In an IS-95/cdma2000 system, a base station transmits a pilot signal on a forward link and a mobile station synchronizes its timing to the base station by acquisition of the pilot signal. For acquisition and tracking of the pilot signal, the mobile station uses a searcher. The searcher detects the strength and position of the pilot signal by calculating the energy of a received signal while changing a PN sequence offset by the same short PN(Pseudo-random Noise) code generator as used in the base station. Here, each PN sequence offset used for pilot acquisition is called a PN hypothesis.

FIG. 1 is a schematic block diagram of a prior art searcher. Referring to FIG. 1, the searcher is comprised of despreaders 101 and 102 for despreading I and Q data with a PN sequence, respectively; correlators 103 and 104 for accumulating the despread data respectively; squarers 105 and 106 for calculating accumulated energy values; an adder 107 for adding the outputs of the squarers 105 and 106; a non-coherent accumulator 108 for non-coherently accumulating the sum received from the adder 107; a comparator 109 for comparing the energy of the non-coherent accumulation value with a threshold, the comparator 109 generating a pilot detection signal if the energy exceeds the threshold, and generates a PN delay signal if the energy is equal to or smaller than the threshold, a PN clock generator 111 for generating a PN delay clock by the PN delay signal of the comparator; and a PN sequence generator 110 for delaying a PN sequence as much as the delayed clock and outputting that to the despreaders 101 and 102 when the delayed clock is inputted from the PN clock generator 111.

A PN sequence is generated using characteristic polynomials like Eq. 1 in the IS-95/cdma2000 system. The PN sequence is of period $2^{15}$ chips (26.66 ms) and produces $2^{15}$ (32,768) PN hypotheses.

$$P_I(x) = x^{15} + x^{14} + x^9 + x^8 + x^7 + x^5 + 1$$

$$P_Q(x) = x^{15} + x^{14} + x^{11} + x^{10} + x^6 + x^5 + x^4 + x^3 + 1 \quad (1)$$

The prior art searcher as shown by FIG. 1 changes a PN hypothesis by delaying and applying the PN sequence with respect to a received signal. FIG. 2 is a detailed construction of the PN clock generator 111 and the PN sequence generator 110 of FIG. 1.

The comparator 109 of FIG. 1 generates the PN delay signal to shift to a next PN hypothesis if an energy value related with the present PN hypothesis does not exceed the threshold and feeds the PN delay signal to the PN clock masking block 202 to thereby preventing block a PN clock signal from being fed to the PN sequence generator 203.

FIG. 3 is a signal diagram illustrating a PN hypothesis moving method in a one-multiple speed searcher. Referring to FIG. 3, if the present PN hypothesis is an Nth PN hypothesis, the memory state of a PN sequence generator is delayed by one chip to shift to an (N+1)th PN hypothesis.

FIG. 4 is a signal diagram illustrating a PN hypothesis moving method in an M-multiple speed searcher. Referring to FIG. 4, the M-multiple speed searcher checks M PN hypotheses at the same time for one correlation length, thereby searching for a pilot signal M times faster than the one-multiple searcher. If the present PN hypothesis is an Nth PN hypothesis, the M-multiple speed searcher despreads the M PN hypotheses by delaying a corresponding PN sequence using an M-tap shift register. Then, the M-multiple speed searcher calculates energy values related to the M PN hypotheses by time-multiplexing the despreading results using a clock signal faster than a chip rate. Since the M-multiple speed searcher applies from Nth PN hypothesis to (N+M−1)th PN hypothesis, if the correlations of the M PN hypotheses are calculated and an energy value related with the present PN hypothesis does not exceed the threshold, the M-multiple speed searcher should shift to (N+M)th PN hypothesis to detect a next PN hypothesis. That is, As shown in FIG. 4, the M-multiple speed searcher holds the memory state of the PN sequence generator by M chips to use the M PN hypotheses after applying the M PN hypotheses. As a result, the PN sequence is delayed from the received data by M chips.

In this method, a 16-multiple speed searcher must wait for 16 chips and a 32-multiple speed searcher must wait for 32 chips in order to shift to a next PN hypothesis. As compared to a one-multiple speed searcher, the M-multiple speed searcher consumes an M-chip dummy time to shift to a next PN hypothesis.

As described above, the conventional searchers delay PN sequences to shift to next PN hypotheses. Therefore, a dummy time required for changing a PN hypothesis increases in proportion to a search speed.

SUMMARY OF THE INVENTION

It is, therefore, an object of the present invention to provide a PN hypothesis moving method that removes a dummy time without influencing a search speed, as compared to the conventional hypothesis moving method relying on a PN sequence delay.

To achieve the above object, there is provided a PN hypothesis moving apparatus and method in a high speed searcher. In the PN hypothesis moving apparatus, a PN sequence generator system has a PN sequence generator for generating a PN sequence and a PN state register for storing information about a PN state. A correlation counter counts the number of correlations, and a comparator receives the output of the correlation counter, a correlation length, and a search speed, compares them, and provides a PN state saving point and a PN state loading point to the PN sequence generator system according to the comparison to change a PN hypothesis.

The PN hypothesis moving method includes the steps of: comparing a correlation count, a correlation length, and a search speed; storing information about a PN state if the correlation count is equal to the correlation length minus the search speed; and loading information about the PN state if the correlation count is equal to the correlation length to change a PN hypothesis at a PN hypothesis changing point. The method also includes the steps of: storing a PN state corresponding to a time point prior to the PN hypothesis changing point; and loading the PN state corresponding to the time point prior to the PN hypothesis changing point during the PN hypothesis changing point.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
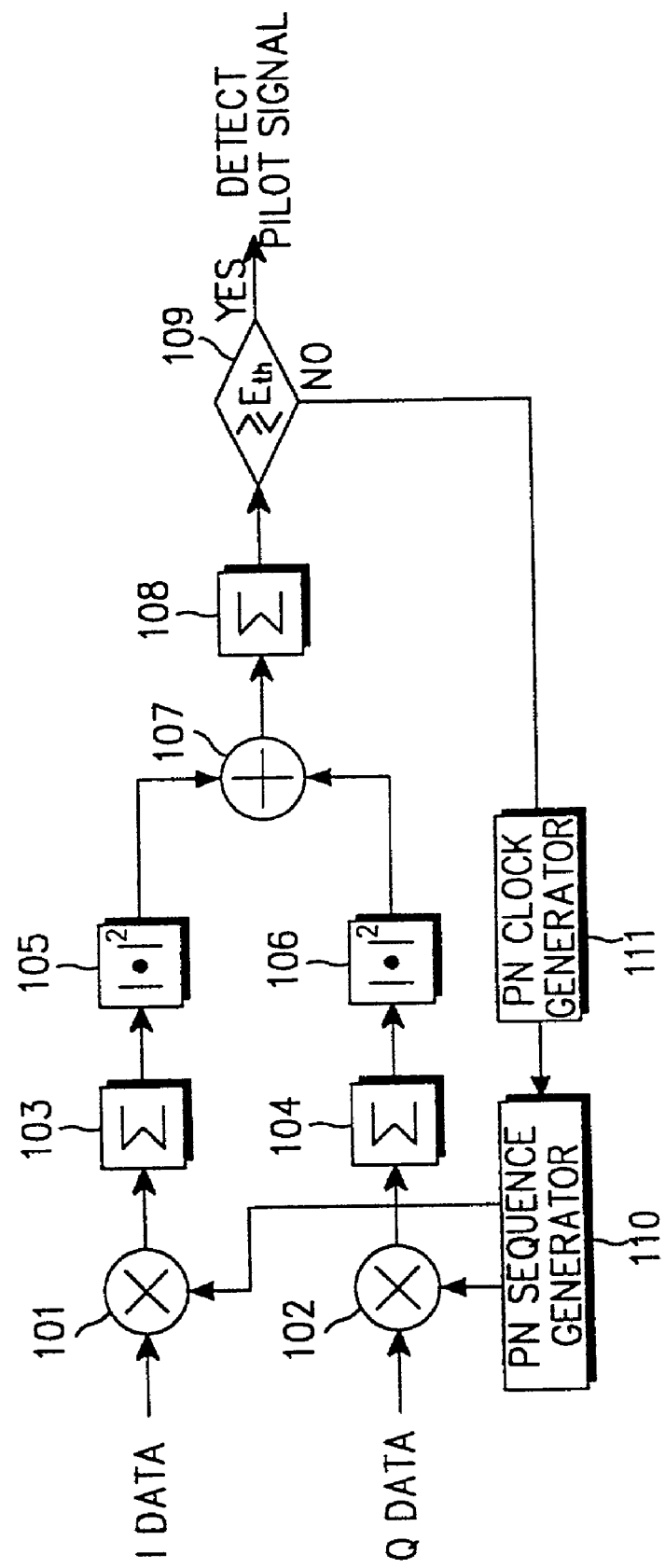
FIG. 1 is a schematic block diagram of a prior art searcher.
Figure 2:
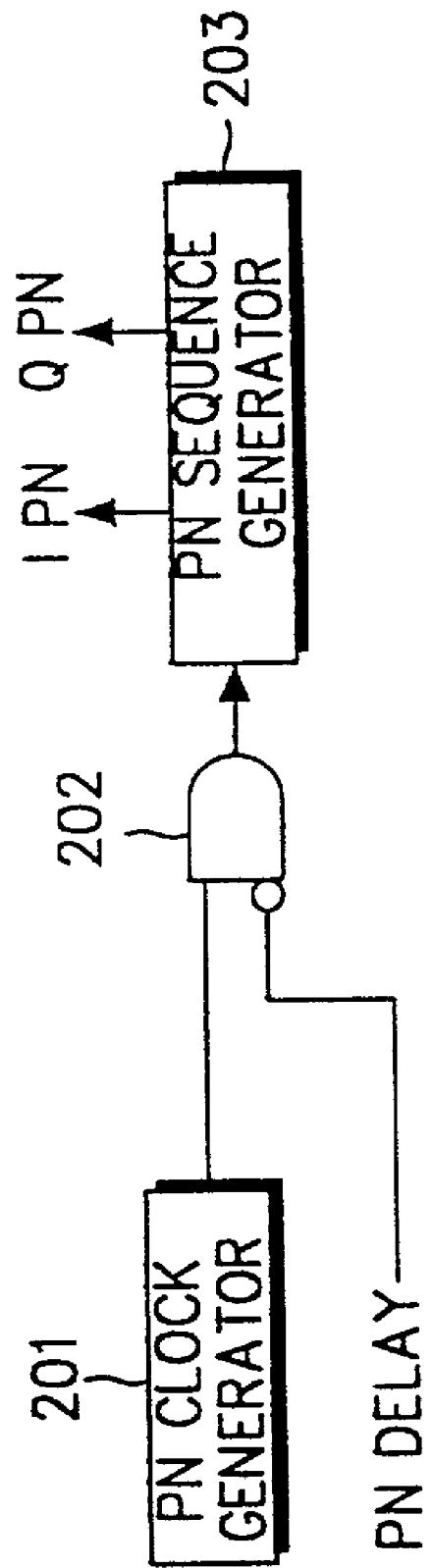
FIG. 2 is a block diagram of a prior art PN hypothesis moving apparatus.
Figure 3:
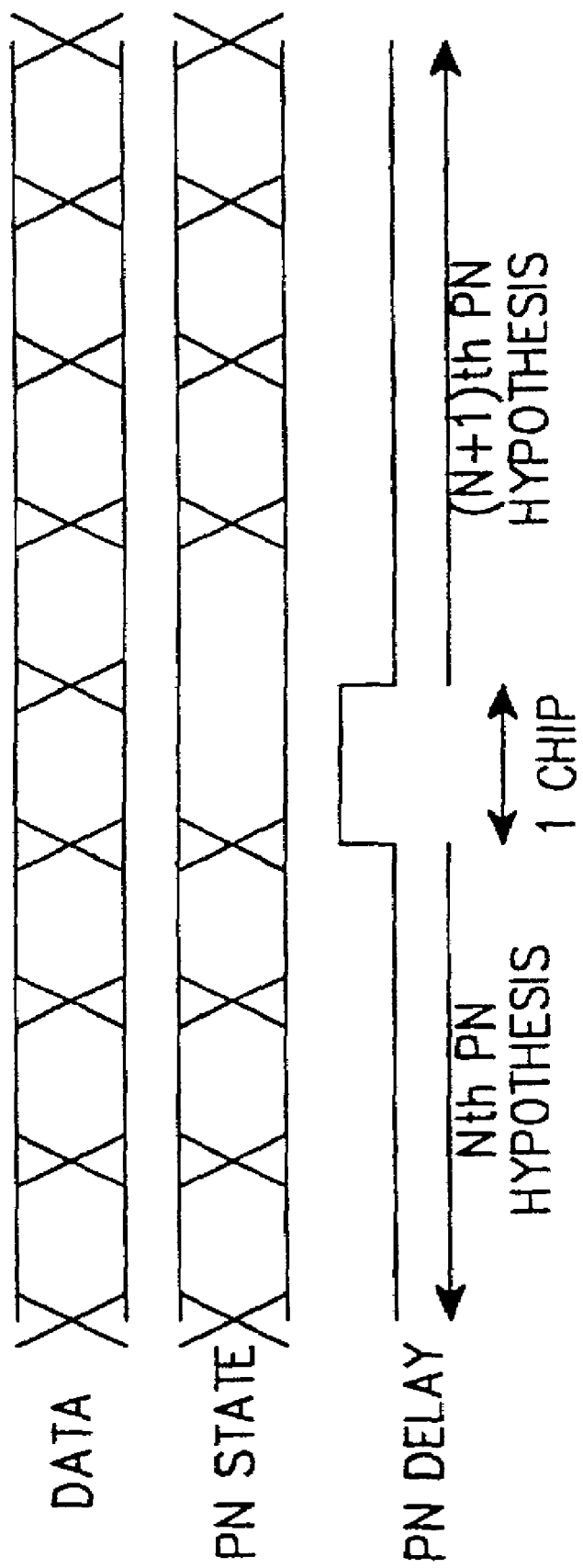
FIG. 3 is a signal diagram illustrating a PN hypothesis moving method in a prior art one-multiple speed searcher.
Figure 4:
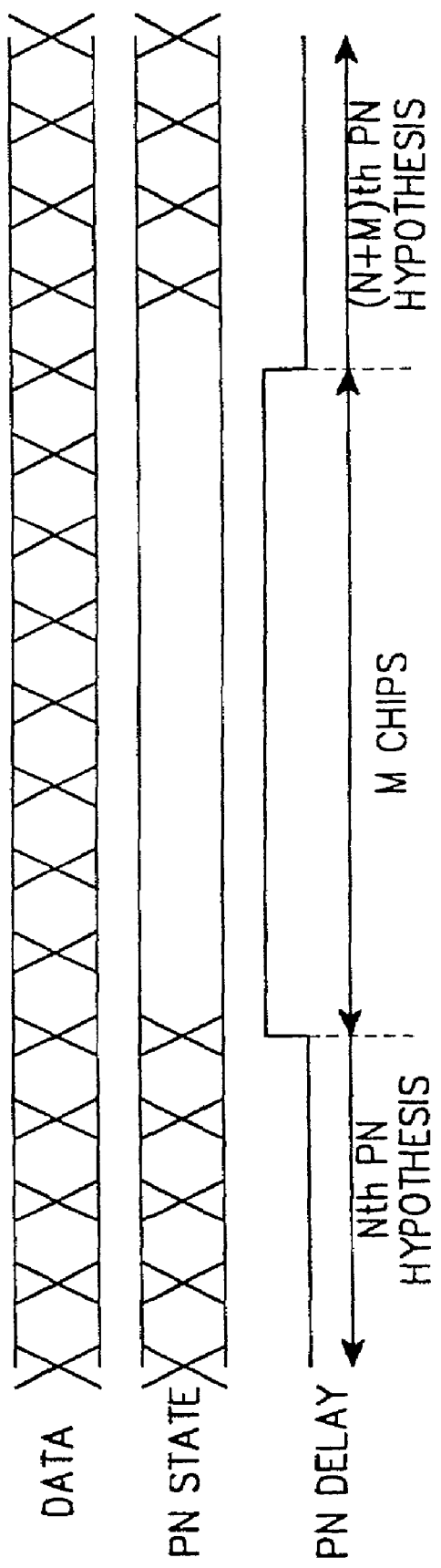
FIG. 4 is a signal diagram illustrating a PN hypothesis moving method in a prior art M-multiple speed searcher.
Figure 5:
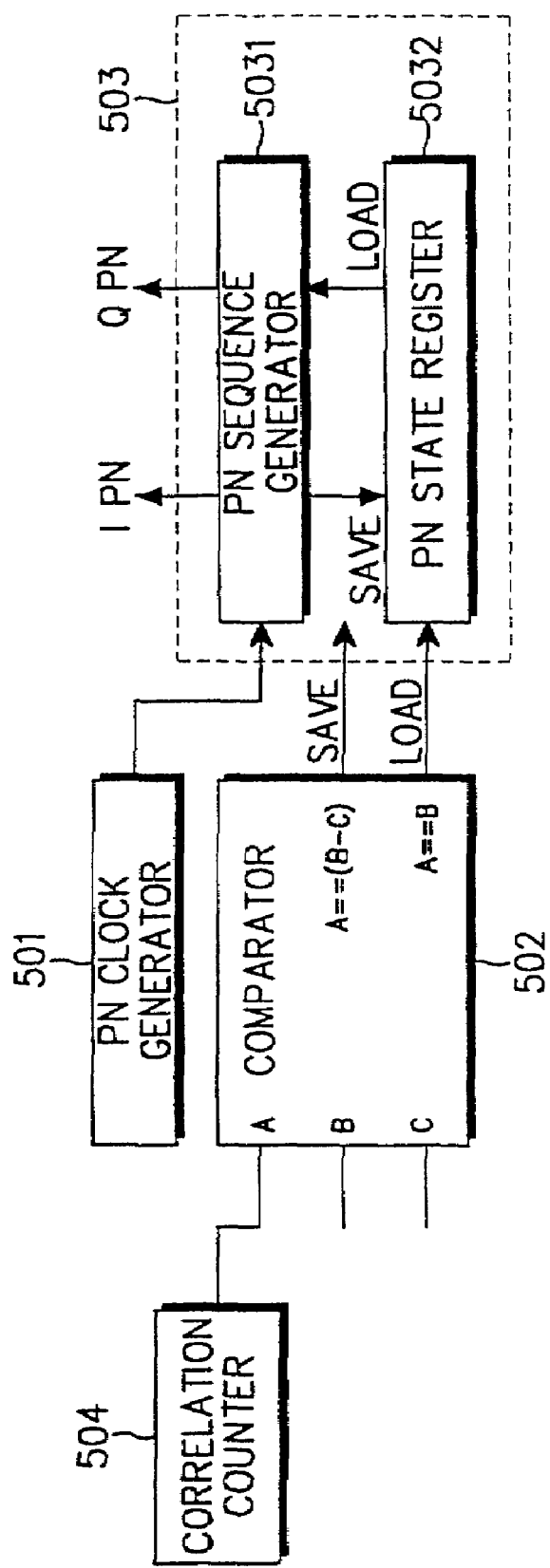
FIG. 5 is a block diagram of a PN hypothesis moving apparatus in a searcher according to an embodiment of the present invention.

FIG. 5 is a block diagram of a PN hypothesis moving apparatus in a searcher according to an embodiment of the present invention. Referring to FIG. 5, the PN hypothesis moving apparatus is comprised of a PN sequence generator system 503 for generating a PN sequence, a PN clock generator 501 for providing a clock signal to the PN sequence generator system 503, a comparator 502 for providing a PN state saving point and a PN state loading point, and a correlation counter 504 for counting correlations. The PN sequence generator system 503 includes a PN sequence generator 5031 for generating a PN sequence according to Equation 1 and a PN state register 5032 for storing the PN state.

The comparator 502 receives a correlation count from the correlation counter 504 via input A. The comparator 502 further receives a correlation length and a search speed via inputs B and C, respectively. The comparator 502 compares the three variables, i.e., the correlation count, the correlation length, and the search speed, and outputs signals indicating a PN state saving point and a PN state loading point according to the comparison result. That is, if the correlation length minus the search speed is equal to the correlation count(A=(B−C)), the comparator 502 outputs the signal indicating a PN state saving point. If the correlation length equals the correlation count (A=B), the comparator 502 outputs the signal indicating a PN state loading point.

Figure 6:
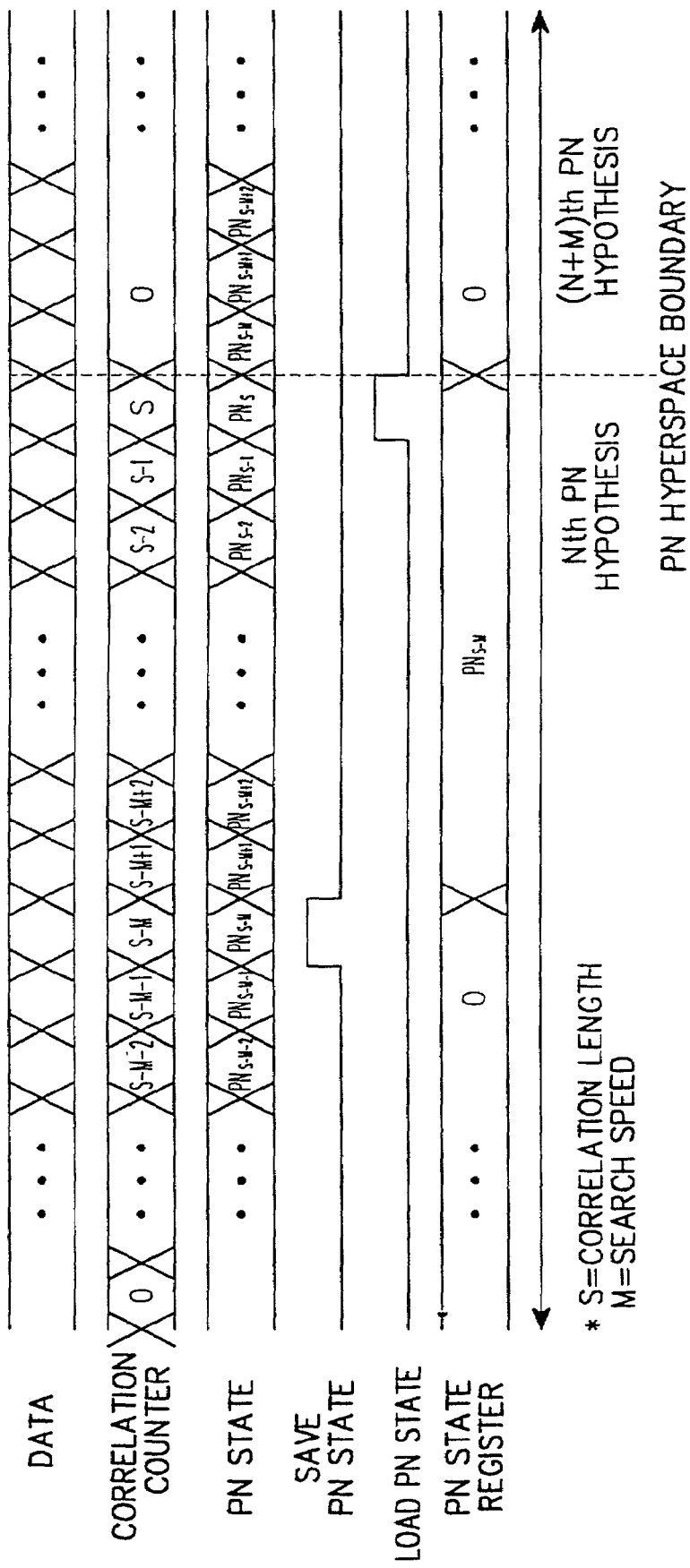
FIG. 6 is a signal diagram illustrating a PN hypothesis moving method according to the embodiment of the present invention.

The operation of the PN hypothesis moving apparatus according to the present invention will be described in more detail referring to FIG. 6. FIG. 6 is a signal diagram illustrating a PN hypothesis moving method according to the embodiment of the present invention. Hereinafter, a correlation length and a search speed are called S and M, respectively. As compared to the conventional PN hypothesis moving method relying on delay of a PN sequence by M chips from received data, when the correlation count of the correlation counter 504 is "S−M+1", a PN state, $PN_{S-M+1}$ stored in the PN state register 5032 and the PN state, $PN_{S-M+1}$ loaded in the PN sequence generator 5031 at a PN hypothesis moving point, thereby shifting to a next PN hypothesis. Loading of the PN state before M chips to the PN sequence generator 5031 is equivalent to delaying the PN sequence by M chips from the received data. In accordance with the present invention, the PN state of the PN sequence generator 5031 M chips before the PN hypothesis moving point is stored in the PN state register 5032 and loaded in the PN sequence generator 5031 at the PN hypothesis moving point, thereby changing the PN hypothesis.

An M-chip delay time involved in changing a PN hypothesis by the conventional M-multiple speed searcher can be eliminated in accordance with the present invention. The PN hypothesis moving apparatus of the present invention obviates the need for the PN clock masking block 202 and additionally has the PN state register 5032 and the comparator 502. The correlation counter 504 is also used in the conventional searcher to count correlations. A search time decreases as a search speed increases in the present invention. For example, in the case of a 32-multiple speed searcher with a 512-chip correlation length, an about 5%-dummy time decrease can be achieved.

As described above, the PN hypothesis moving apparatus of the present invention is provided with a comparator for receiving information about a correlation count, a correlation length, and a search speed, comparing them, and providing a PN state saving point and a PN state loading point to a PN sequence generator, to thereby change a PN hypothesis. A PN state at a time point earlier than a PN hypothesis changing point by a time determined by the search speed is stored in the PN sequence generator. The stored PN state is loaded at the PN hypothesis changing point. Thus, a PN hypothesis can be changed without any dummy time, while the search speed is still maintained.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A PN (Pseudorandom Noise) hypothesis moving apparatus in a high speed searcher, for synchronizing a mobile station comprising:

a correlation counter for counting the number of correlations; a comparator for receiving a correlation count, for comparing the correlation count with at least one parameter and for providing one of a storing command and a loading command according to the comparison to change a PN hypotheses; and a PN sequence generator system for storing a PN state according to the storing command and outputting the PN state according to the loading command of the comparator to synchronize the mobilestation.

2. The PN hypothesis moving apparatus of claim 1, wherein the at least one parameter includes a correlation length and a search speed.

3. The PN hypothesis moving apparatus of claim 2, wherein the comparator provides the storing command indicating if the correlation length minus the search speed is equal to the correlation count, and the comparator provides the loading command if the correlation length is equal to the correlation count.

4. The PN hypothesis moving apparatus of claim 1, wherein the PN sequence generator system comprises a PN sequence generator for generating a PN sequence, and a PN state register for storing the PN state according to the storing command and outputting the stored PN state according to the loading command.

5. A PN hypothesis moving method in a high speed searcher, for synchronizing a mobile station comprising the steps of:

receiving a correlation count, a correlation length, and a search speed;

storing information about a PN state, if the correlation count is equal to the correlation length minus the search speed; and loading information about the PN state, if the correlation count is equal to the correlation length to synchronize the mobile station by changing a PN hypothesis at a PN hypothesis changing point.

6. The method of claim 5, further comprising the steps of:

storing the PN state corresponding to a time point prior to the PN hypothesis changing point; and loading the PN state corresponding to the time point prior to the PN hypothesis changing point during the PN hypothesis changing point.

* * * * *